United States Patent [19]

Stuckey

[11] Patent Number: 4,989,716
[45] Date of Patent: Feb. 5, 1991

[54] ADJUSTABLE ANGLE AUGER

[76] Inventor: Gerald Stuckey, R.R. 1, Box 174, Martinton, Ill. 60951

[21] Appl. No.: 535,531

[22] Filed: Jun. 11, 1990

[51] Int. Cl.[5] .............................. B65G 33/32
[52] U.S. Cl. ................... 198/311; 198/313; 198/536; 198/584; 198/668; 198/550.2; 198/550.1
[58] Field of Search ............. 198/666, 668, 311, 313, 198/318, 535, 536, 584, 660, 668, 666, 550.1, 550.2

[56] References Cited

U.S. PATENT DOCUMENTS

| 796,477 | 8/1905 | Wallace | 198/668 X |
|---|---|---|---|
| 2,022,166 | 11/1935 | Welty | 198/550.1 |
| 3,016,128 | 1/1962 | Hacker | 198/668 |
| 3,100,052 | 8/1963 | Brembeck | 198/550.2 X |
| 3,175,676 | 3/1965 | Vander Schaaf | 198/668 X |
| 3,252,562 | 5/1966 | Brembeck | 198/668 X |
| 3,337,068 | 8/1967 | Meharry | 198/313 X |
| 3,580,384 | 5/1971 | Pingree | 198/668 X |
| 4,093,087 | 6/1978 | De Gene | 198/668 X |
| 4,512,687 | 4/1985 | Enns | 198/318 X |
| 4,526,265 | 7/1985 | Enns | 198/318 |
| 4,530,429 | 7/1985 | Erickson | 198/313 |
| 4,669,945 | 6/1987 | Pollard et al. | 198/313 X |
| 4,714,398 | 12/1987 | Rohwedder | 198/313 X |
| 4,739,868 | 4/1988 | Head | 198/318 X |
| 4,923,358 | 5/1990 | Van Mill | 198/550.1 X |

FOREIGN PATENT DOCUMENTS

| 1055652 | 2/1954 | France | 198/668 |
|---|---|---|---|
| 1201727 | 1/1960 | France | 198/668 |
| 1297945 | 11/1972 | United Kingdom | 198/668 |
| 1426181 | 2/1976 | United Kingdom | 198/668 |

Primary Examiner—D. Glenn Dayoan
Attorney, Agent, or Firm—Foley & Lardner, Schwartz, Jeffery, Schwaab, Mack, Blumenthal & Evans

[57] ABSTRACT

A portable angle auger apparatus for conveying bulk material comprising a conveyor auger and duct pivotable with respect to a supply auger and duct, a pivot hinge attached to beveled ends of the ducts and a movable flexible covering for the pivot juncture. The pivot juncture and flexible covering are designed such that the apparatus can be assembled and disassembled quickly by one individual.

8 Claims, 3 Drawing Sheets

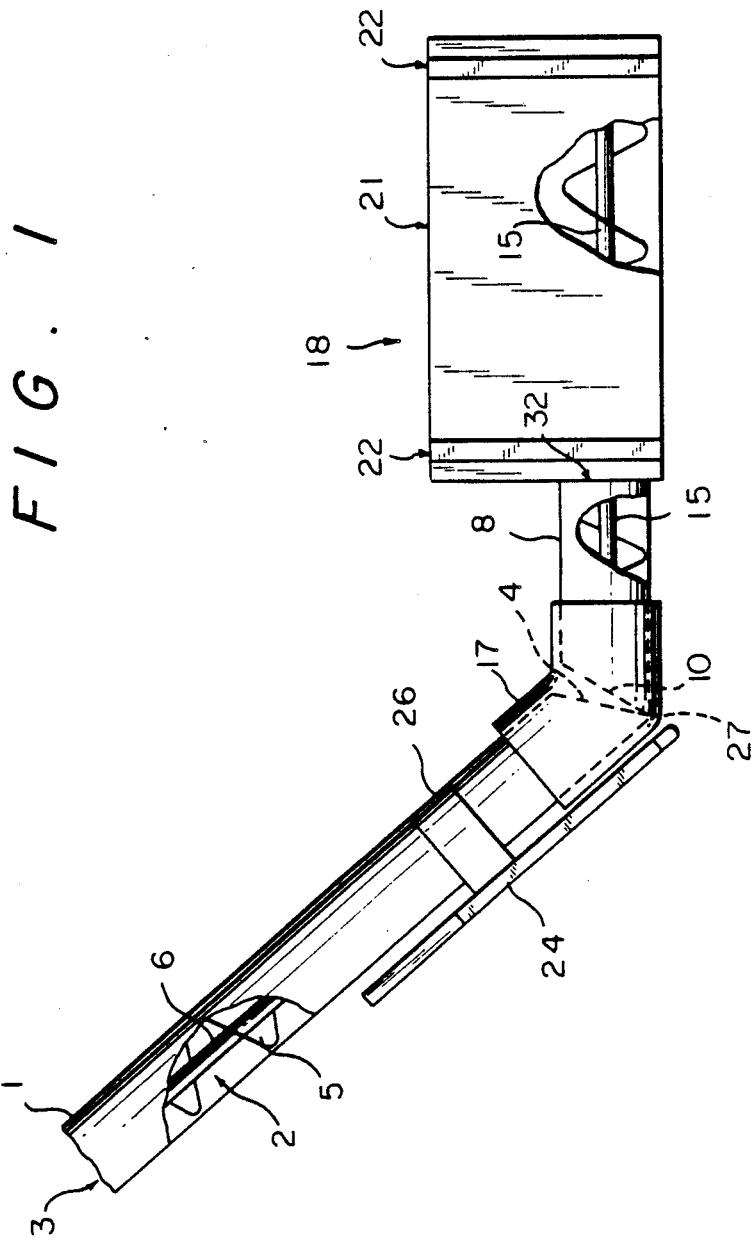

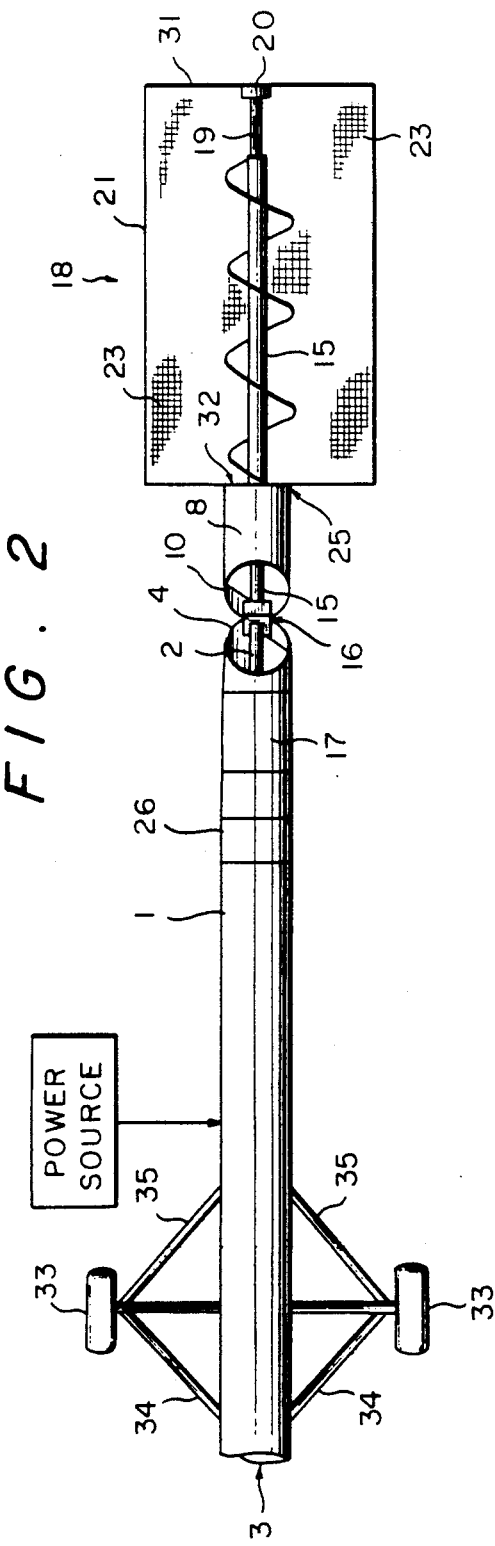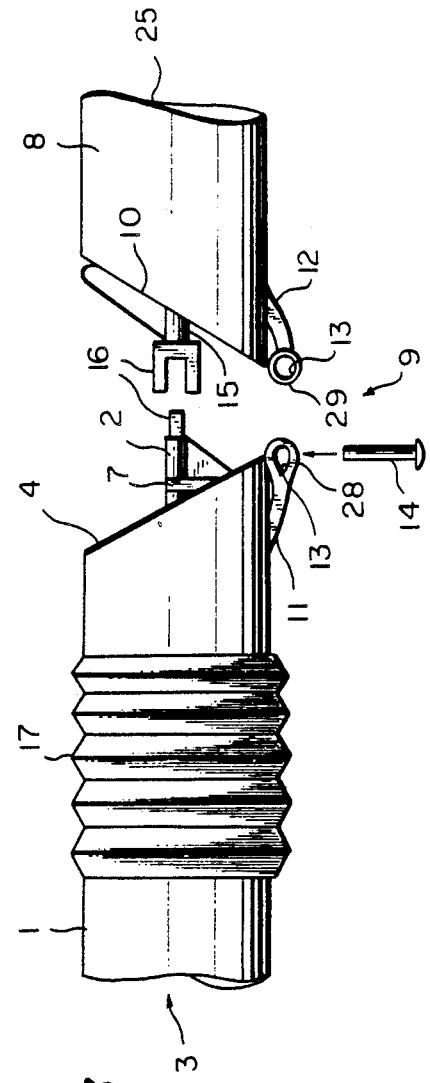

ADJUSTABLE ANGLE AUGER

BACKGROUND OF THE INVENTION

The present invention relates to a portable auger conveyor which is used for conveying bulk materials such as grain.

Conventional portable augers, such as that described in U.S. Pat. No. 4,142,621, include a non-pivoting, straight auger surrounded by a duct and attached to a supply hopper having a base positioned in the same plane as the auger and duct. Since the auger and duct do not pivot relative to each other, raising the deposit end of the auger and duct to an elevated deposit area results in tilting or angling of the supply hopper relative to the ground surface. This tilting of the supply hopper causes problems in loading the hopper from wagons or trucks.

Stationary auger apparatus having a height-adjustable, main conveyor auger and duct pivotable about a horizontal axis with respect to a horizontally flat supply hopper are described in U.S. Pat. Nos. 3,175,676 and 3,014,575. The apparatus described therein include complicated pivot junctures. During harvest season, time is at a premium and thus portable augers are in continuous use. Since it is often necessary to move a portable auger to various work sites, it is advantageous to be able to assemble and disassemble the auger as quickly and easily as possible. The involved and time-consuming mechanics required to assemble and disassemble known horizontally pivoting auger apparatus makes them unsatisfactory for use on a portable auger. There is a need for a portable auger with a pivotable supply duct having a simple, readily assembled and disassembled mechanical structure.

SUMMARY OF THE INVENTION

It is therefore an object of the present invention to provide a portable auger apparatus for conveying bulk material that has a pivot juncture so that the discharge end of the apparatus is adjustable to varying elevations and angles of incline and the supply hopper or duct can be positioned horizontally with respect to the ground surface. Furthermore, the design of the pivot juncture should be simple enough to allow quick and easy assembly and disassembly by one individual.

In accomplishing the foregoing objects there is provided according to the present invention a portable angle auger apparatus comprising a conveyor auger disposed within a conveyor duct having an end beveled to project at the bottom and recede at the top, a supply auger disposed within a supply duct having an end beveled to project at the bottom and recede at the top, means for coupling the conveyor auger and supply auger so that the augers rotate together and their axes are pivotable relative to each other, means for connecting the projecting bottom ends of the conveyor duct and the supply duct such that the beveled ends diverge upwardly from a convergence point formed by the connecting projected ends so that the slope and discharge end height of the conveyor duct can be varied by pivoting about the duct connecting means and a movable flexible covering for a pivot juncture defined by the connected ends of the ducts, auger coupling means and duct connecting means while the apparatus is operating, wherein the flexible covering is displaceable from the pivot juncture so as to facilitate disassembly when the apparatus is not in operation.

In a preferred embodiment of the present invention the connecting means comprise a hinge. Preferably, the hinge comprises a first stationary member attached underneath the beveled end of the conveyor duct, a second stationary member attached underneath the beveled end of the supply duct and an insertable pin for connecting the first and second sections.

In another preferred embodiment of the present invention a supply hopper is coupled to the supply duct such that the supply auger extends into the hopper.

Other objects, features and advantages of the present invention will become apparent from the following detailed description.

BRIEF DESCRIPTION OF THE DRAWINGS

FIG. 1 is an elevational view partly broken away of a connected auger apparatus including a supply hopper according to the present invention.

FIG. 2 is a top plan view of the embodiment shown in FIG. 1.

FIG. 3 is an enlarged elevational view of the unconnected pivot juncture according to the present invention.

Throughout the various figures of the drawings the same reference numerals are used to designate the same elements. A detailed description of the auger apparatus according to the present invention appears below with reference to the drawings.

DETAILED DESCRIPTION OF THE PREFERRED EMBODIMENTS

Figure 4:
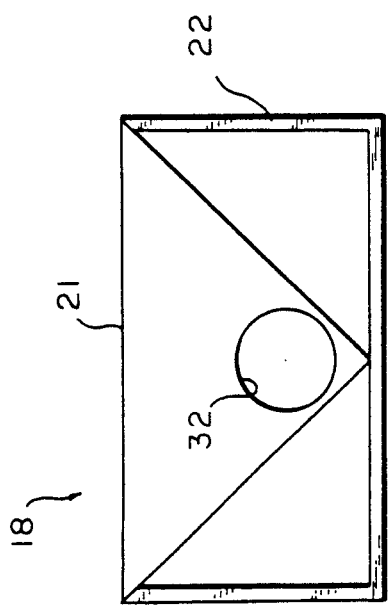
FIG. 4 is a side elevational view of the supply hopper shown in FIGS. 1 and 2.

As shown in FIG. 1, a conveyor duct 1 encloses a conveyor auger 2 so as to define a conveying path for bulk materials such as grain. The conveyor duct 1 preferably has a circular cross-section and may be constructed from a rigid material such as metal or plastic. The conveyor duct 1 can be angled or elevated relative to a substantially horizontal surface so as to extend from the surface to a deposit or storage bin or any area to which a bulk material is desired to be conveyed. Additional conveyor means (not shown), 13 as described, for example, in U.S. Pat. No. 4,356,910, can be attached to conveyor duct 1 for further extending the conveying path.

The conveyor duct 1 is provided with a discharge end 3 for either discharging the bulk material into the deposit or storage area or connecting the conveyor duct 1 to additional conveyor means. The conveyor duct 1 also is provided with an end 4 beveled to project at the bottom and recede at the top.

The conveyor auger 2 consists of a standard auger of known type for conveying bulk materials. Generally, the conveyor auger 2 comprises a series of flights 5 in a screw configuration and an auger shaft 6 for supporting the screw flights. As shown in FIG. 3, disposed within the conveyor duct 1 near the beveled end 4 is a bearing support 7 for the conveyor auger 2.

A supply duct 8 having an end 10 beveled to project at the bottom and recede at the top is connected by means of a hinge 9 to the beveled end 4 of the conveyor duct 1. The beveled duct ends 4 and 10 are connected such that each end diverges upwardly from a convergence point 27 formed by the adjacent projecting beveled ends. The supply duct 8 has a cross-section configuration and material construction similar to that of conveyor duct 1 and, preferably, the cross-sectional areas of the conveyor and supply ducts are substantially the same. The supply duct has a supply intake end 25 through which bulk material enters the supply duct 8.

The hinge 9 is positioned so that the slope and discharge end 3 of the conveyor duct 1 can be varied by pivoting about the hinge 9. The joined ends 4 and 10 of the ducts 1 and 8 are beveled at an angle that allows the conveyor duct 1 and supply duct 8 to pivot relative to each other so that the conveyor duct 1 may angle or slope to an elevated deposit area. Preferably, the duct ends 4 and 10 are beveled at an angle of about 20 to 70 degrees.

The hinge 9 is constructed so that the ducts 1 and 8 can be easily and swiftly detached mechanically when the apparatus is to be transported to another work site. Although any type of simple, easy to connect hinge may be employed in the present invention, the preferable hinge 9 embodiment shown in FIG. 3 comprises a first stationary member 11 attached underneath the projecting beveled end 4 of the conveyor duct 1 and a second stationary member 12 attached underneath the projecting beveled end 10 of the supply duct 8. The first and second stationary members 11 and 12 are formed with complimentary projections 28 and 29 which intermesh when the ducts 1 and 8 are placed adjacent and which define an aligned aperture 13 for receiving a hinge pin 14. The hinge pin 14 is inserted into the receiving hole 13 so as to pivotally secure the first and second stationary members 11 and 12, thereby allowing the ducts 1 and 8 to pivot with respect to one another. In other words, the stationary members 11 and 12 are stationary relative to their respective associated ducts but pivot relative to each other about the hinge pin 14.

In addition to the ducts 1 and 8 being connected, a supply auger 15, disposed within the supply duct 8, is coupled to the conveyor auger 2 by detachable means 16 so that augers 2 and 15 rotate together and the axes of the augers 2 and 15 are pivotable relative to each other. The supply auger 15 comprises an auger of the same type as that of the conveyor auger 2. Bearing support 7 provides adequate support for the supply auger 15 when augers 2 and 15 are coupled together.

Paralleling the same requirements as for the hinge 9, the auger coupling means 16 may be any means that is easily and swiftly detached mechanically when the apparatus is to be transported to another work site. Preferably, the detachable auger coupling means 16 comprise a standard single universal joint. The connecting means 16 also may include additional components (not shown) to assist the conveyance of bulk material from the supply duct 8 to the conveyor duct 1.

A movable flexible covering 17 is provided for the pivot juncture defined by the above-described duct and auger connections. When in place, the flexible covering 17 is designed to encompass the beveled ends 4 and 10, the auger coupling means 16 and the hinge 9, i.e., the pivot juncture. The flexible covering 17 may be constructed of rubber or plastic-like material which is sufficiently flexible for bending into any angle at which the ducts may be positioned and yet be sufficiently constricting so as to maintain a tight closure over the pivot juncture thereby preventing spillage of conveyed bulk material. As shown in FIG. 3, the flexible covering also may be formed with folds or pleats so as to expand or contract upon angling of the conveyor duct 1.

Advantageously, the flexible covering 17 is not permanently fastened to any element of the present apparatus. Thus, the flexible covering can be displaced from covering the pivot juncture and slipped to either of the ducts 1 or 8 so as to encompass a portion of the ducts when the apparatus is not in conveying operation. Fastening means (not shown) for temporarily securing the flexible covering 17 to the ducts so as to prevent slippage of the flexible covering 17 when the apparatus is in conveying operation or is being transported also may be provided.

The supply duct 8 and auger 15 may be placed directly into an uncontained mound of bulk material. Preferably, however, a supply hopper 18, which can contain bulk material, is provided, into which the supply auger 15 may be inserted. The supply duct 8 may be coupled with the supply hopper 18 but preferably does not extend into the supply hopper 18. The supply hopper 18 may be formed with an aperture 32 to which the supply duct 8 can be joined.

A portion of a telescoping shaft 19 is disposed within the supply auger shaft 15 so that the length of the supply auger can be adjusted as the conveyor auger 2 is angled to a deposit area. In the embodiment of the present invention having a coupled supply hopper as shown in FIG. 2, the telescoping shaft 19 extends into the supply hopper 18 and is rotatably mounted on a telescoping shaft bearing 20 attached to a supply hopper wall 31. By supporting the supply auger 15, the telescoping shaft 19 acts to secure the supply auger 15 within the supply duct 8 and the supply hopper 18.

The supply hopper 18 may be of any configuration adequate for holding bulk material. As shown in FIG. 4, the supply hopper 18 preferably comprises a generally V-shaped trough 21 with closed ends, preferably having a length of 4 feet, width of 2 feet and height of 1 foot, and a pair of legs 22 positioned at opposite ends of the trough 21 for supporting the hopper on a surface. The supply auger 15 is disposed within the supply hopper 18 near the bottom of the V-shaped configuration. In addition, the supply hopper 18 may be covered with a safety grill 23 that is positioned in the supply hopper 18 over the auger 15.

Due to the unique design of the pivot juncture the supply hopper 18 can remain resting horizontally with respect to the surface even when the conveyor duct 1 is angled to an elevated deposit bin. A horizontal supply hopper can be loaded with greater ease than prior art hoppers which are positioned at an angle with respect to the surface.

Figure 5:
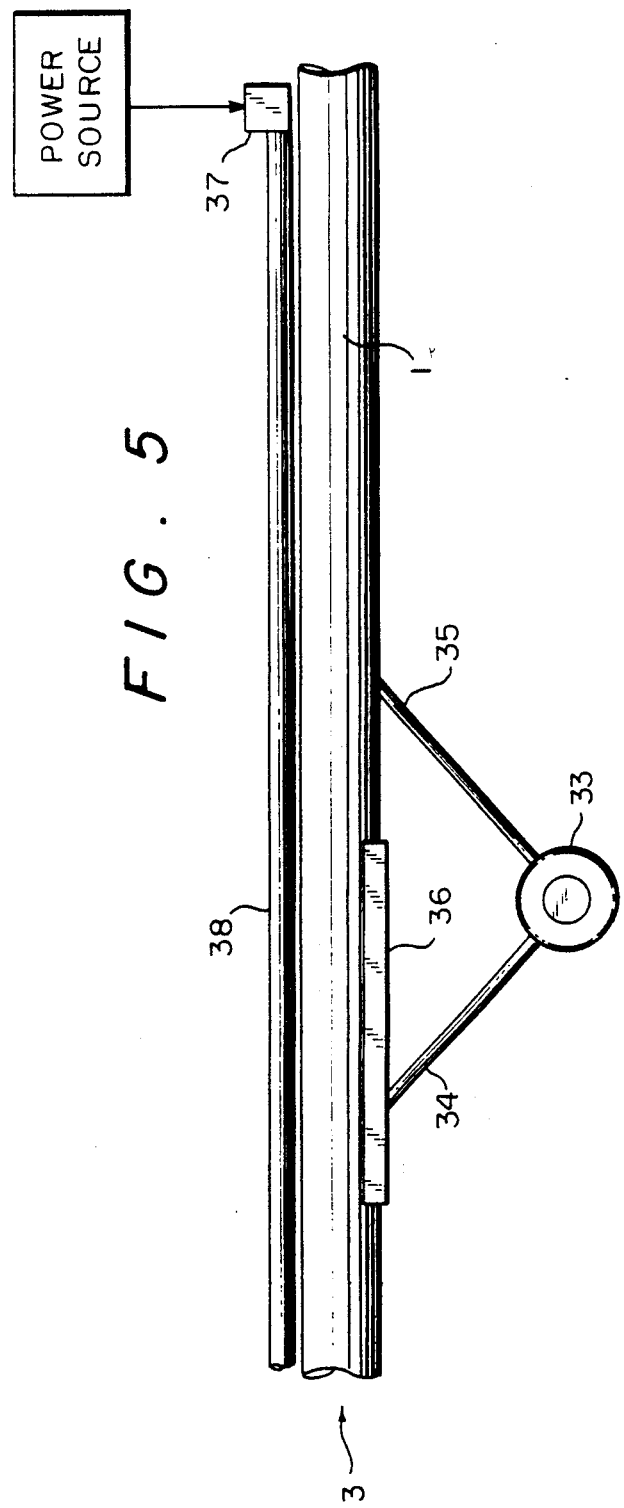
FIG. 5 is a side elevational view of the conveyor portion according to the present invention.

Since the present apparatus is designed to be portable a transportation hitch 24 is fastened to the conveyor duct 1 by means of a collar 26. As shown in FIGS. 2 and 5 a pair of wheels 33 can be attached to the conveyor duct 1 by means of supporting struts 34 and 35. Supporting strut 34 is secured in a channel 36 such that the strut 34 is moveable along the channel 36 so as to adjust the height of the conveyor duct discharge end 3.

To drive the conveyor auger 2 which in turn drives the supply auger 15 a conventional power source (shown schematically in FIG. 2) is connected, through a gear box 37, to a shielded drive shaft 38 which drives the conveyor auger 2 from the discharge end 3. The power source may be an internal combustion engine or a tractor powered take off.

As mentioned previously, the purpose of the present design is to enable one person to quickly assemble and disassemble the conveying apparatus in order to easily transport the apparatus to various work sites. As evident from the above-described embodiments of the present invention, one person can quickly and easily assemble and disassemble the present apparatus according to the procedure described below.

The present apparatus can be assembled simply by coupling the conveyor auger 2 to the supply auger 15, which may be either coupled to a supply hopper or inserted directly into an uncontained mound of bulk material, through use of the auger coupling means 16. While coupling the augers, the operator also aligns the ducts to ensure interlinking of the first and second stationary hinge members 11 and 12. Then, the hinge pin 14 is inserted into the aperture 13 thereby pivotally joining the ducts 1 and 8. Finally, the operator slides the flexible covering 17 over the hinge and pivot juncture formed by the ducts and augers. At any point the power source may be connected to the conveyor auger 2.

The assembled apparatus according to the present invention thus provides a conveying path, defined by the supply duct 8 and conveying duct 1, for bulk materials. Accordingly, bulk materials either placed into a supply hopper 18 or simply heaped on the surface can be conveyed to any elevated storage area simply by adjusting the slope of the conveyor duct 1.

To disassemble the present apparatus the flexible covering 17 is transferred from covering the pivot juncture to a position where it encompasses a portion of either duct simply by sliding the flexible covering over the duct. Subsequently, the auger coupling means 16 is detached, the hinge pin 14 is removed and the joined ducts are uncoupled. The present apparatus can then be transported to another work site simply by hooking the transport hitch 24 to a vehicle and placing the unattached supply auger and duct portion onto the same or another vehicle.

While the present invention has been described with reference to particular preferred embodiments, it will be understood that many variations, modifications and other embodiments are both possible and expected, all within the spirit and scope of the appended claims.

What is claimed is:

1. A portable adjustable angle auger apparatus for conveying bulk materials comprising:
    a conveyor duct having an end beveled to project at the bottom and recede at the top and a discharge end;
    a supply duct having an end beveled to project at the bottom and recede at the top and a supply intake end;
    a conveyor auger disposed within said conveyor duct;
    a supply auger disposed within said supply duct;
    means for coupling said supply auger to said conveyor auger so that said augers rotate together and the axes of said augers are pivotable relative to each other;
    means for connecting said conveyor duct and said supply duct at the projecting beveled ends such that each duct end diverges upwardly from a convergence point formed by the connected projecting ends so that the slope and discharge end height of said conveyor duct can be varied by pivoting said conveyor duct relative to said supply duct about said duct connecting means; and
    a movable flexible covering for said ducts at said convergence point, said auger coupling means disposed within said ducts and said duct connecting means while said apparatus is conveying bulk materials; wherein said movable flexible covering is displaceable from said convergence point so as to facilitate disassembly of said apparatus.

2. The apparatus as recited in claim 1, wherein said duct connecting means comprise a hinge.

3. The apparatus as recited in claim 1, further comprising a supply hopper coupled to said supply duct such that said supply auger extends into said supply hopper.

4. The apparatus as recited in claim 1, further comprising a transport hitch fastened to said conveyor duct.

5. The apparatus as recited in claim 3, wherein said supply auger is mounted within said supply hopper by means of a telescoping shaft disposed within said supply auger said telescoping section being rotatably mounted on a telescoping shaft bearing attached to said supply hopper.

6. The apparatus as recited in claim 1, wherein said auger coupling means comprise a single U-joint.

7. The apparatus as recited in claim 3, wherein said supply hopper has a rectangular configuration and is formed with an aperture to which said supply duct is joined.

8. The apparatus as recited in claim 2, wherein said hinge comprises a first stationary member attached underneath said projecting beveled end of said conveyor duct, a second stationary member attached underneath said projecting beveled end of said supply duct and an insertable pin for connecting said first and second stationary members, wherein said first and second stationary members are formed with complimentary projections which intermesh to define an aligned aperture into which said pin is inserted.

* * * * *